United States Patent
True et al.

(10) Patent No.: US 11,834,728 B2
(45) Date of Patent: Dec. 5, 2023

(54) METHOD AND SYSTEM OF REDUCING NON-FERROUS METAL CONTENT OF SCRAP STEEL

(71) Applicant: Nucor Corporation, Charlotte, NC (US)

(72) Inventors: Brad True, Rock Hill, SC (US); David W. Hendrickson, Hibbing, MN (US)

(73) Assignee: NUCOR CORPORATION, Charlotte, NC (US)

( * ) Notice: Subject to any disclaimer, the term of this patent is extended or adjusted under 35 U.S.C. 154(b) by 24 days.

(21) Appl. No.: 17/585,131

(22) Filed: Jan. 26, 2022

(65) Prior Publication Data

US 2022/0235430 A1 Jul. 28, 2022

Related U.S. Application Data

(60) Provisional application No. 63/141,917, filed on Jan. 26, 2021.

(51) Int. Cl.
*C22B 1/00* (2006.01)
*C22B 9/20* (2006.01)

(52) U.S. Cl.
CPC .............. *C22B 1/005* (2013.01); *C22B 9/20* (2013.01)

(58) Field of Classification Search
CPC ................................ C22B 1/0005; C22B 9/20
See application file for complete search history.

(56) References Cited

U.S. PATENT DOCUMENTS

| 2,403,419 A | 7/1946 | Wilkins et al. |
| 3,885,744 A | 5/1975 | Drage |
| (Continued) | | |

FOREIGN PATENT DOCUMENTS

| CN | 108950128 B | 10/2020 |
| IN | 202011001830 A | 7/2021 |
| (Continued) | | |

OTHER PUBLICATIONS

USPTO; International Search Report and Written Opinion for International Patent Application No. PCT/US2022/013867 dated Apr. 13, 2022, 10 Pages.

(Continued)

*Primary Examiner* — Scott R Kastler
(74) *Attorney, Agent, or Firm* — Lauren E. Burrow; Moore & Van Allen PLLC (57) ABSTRACT

Methods of reducing copper metal content of shredded scrap steel are provided. The method includes continuously separating a first scrap steel fraction from an amount of scrap steel concurrently with separating a second fraction from the amount of scrap steel; continuously separating the second fraction and providing a nonmagnetic fraction and, concurrently, a third scrap steel fraction; grinding the nonmagnetic fraction followed by magnetic separation to provide a fourth scrap steel fraction and, concurrently, an enriched nonmagnetic fraction; continuously combining the first scrap steel fraction, the third scrap steel fraction, and the fourth scrap steel fraction to obtain a combined scrap steel product comprising scrap steel with reduced copper metal content; and introducing the combined scrap steel product to an electric arc furnace. Systems of reducing copper metal content of shredded scrap steel are also provided.

19 Claims, 4 Drawing Sheets

(56) References Cited

U.S. PATENT DOCUMENTS

| | | | |
|---|---|---|---|
| 4,129,443 A | | 12/1978 | Kaufman |
| 4,883,584 A | * | 11/1989 | Sattler ..................... B03C 1/00 |
| | | | 209/229 |
| 5,667,553 A | | 9/1997 | Keegel, Jr. |
| 6,974,097 B2 | | 12/2005 | Simon et al. |
| 8,459,466 B2 | | 6/2013 | Duffy et al. |
| 10,400,320 B2 | | 9/2019 | Hicks et al. |
| 11,590,513 B1 | * | 2/2023 | Brown ................. B03C 1/0335 |
| 2007/0180955 A1 | | 8/2007 | Warner |
| 2007/0264151 A1 | | 11/2007 | Cho et al. |
| 2007/0283785 A1 | | 12/2007 | Agrawal et al. |
| 2009/0159511 A1 | | 6/2009 | Molteni |
| 2009/0236268 A1 | * | 9/2009 | Shulman ................. B07C 5/344 |
| | | | 209/636 |
| 2011/0000340 A1 | | 1/2011 | Matsui et al. |
| 2016/0339445 A1 | | 11/2016 | Robinson |
| 2019/0046992 A1 | | 2/2019 | Primavera et al. |
| 2020/0261952 A1 | | 8/2020 | Murata et al. |
| 2021/0046509 A1 | | 2/2021 | Andersen |
| 2022/0235430 A1 | * | 7/2022 | True ....................... C21C 5/527 |

FOREIGN PATENT DOCUMENTS

| | | |
|---|---|---|
| KR | 1020210036768 A | 4/2021 |
| WO | 2019246378 A | 12/2019 |
| WO | 2021094646 A1 | 5/2021 |

OTHER PUBLICATIONS

Jaykrishna Magnetics Pvt. Ltd.; "Separate & Sort Scrap Metal Using Eddy Current Separator," YouTube, 2020, https://www.youtube.com/watch?v=P57a7mUGyDw.

SGM Magnestics S.P.A .; "Polishing Drum Magnet PDM Model," 2018, 2 Pages, Downloaded from the Internet, http://separation.sgmmagnetics.com/Magnetism/FerrousSeparator/PDM.aspx.

Sokolov, Denis; "Metal Separator for Copper and Stainless Steel," Savonia University of Applied Sciences, Final Thesis, 2012, 49 Pages.

* cited by examiner

METHOD AND SYSTEM OF REDUCING NON-FERROUS METAL CONTENT OF SCRAP STEEL

CROSS-REFERENCE TO RELATED APPLICATION

This application claims the benefit of priority to U.S. Provisional Patent Application No. 63/141,917, filed on Jan. 26, 2021, the content of which is incorporated herein by reference in its entirety for all purposes.

TECHNICAL FIELD

This disclosure is directed to methods and systems of reducing non-ferrous metal content of shredded scrap steel. In particular, the method and system provide for continuous sorting and separation of shredded scrap steel to provide a low copper content shredded scrap steel product for sheet steel (e.g., hot roll coils) manufacture.

BACKGROUND

Scrap steel is a valuable resource and can be recycled and used for making new steel products. An abundant source of scrap steel comes from automobiles and home appliances. Scrap steel from automobiles and home appliances is normally contaminated with nonferrous metals such as copper, aluminum, brass, bronze, nickel, chrome, manganese, and/or gold and silver requiring blending higher dollar feedstocks (pig iron and/or directly reduced iron (DRI)) that can be very costly and time consuming. Conventional methods of separating nonferrous materials from scrap steel are labor-intensive, requiring "pickers" that visually observe shredded scrap conveying along a conveyor belt and remove obvious nonferrous material. Gamma-Tech™ scrap analyzers can be used as they provide real-time feedback to manage feedstock to scrap yard shredders to reduce copper. However, Gamma-Tech™ scrap analyzers have no sorting capabilities, do not reduce labor and require substantial capital costs. Feedstock needs to be manipulated to generate the desired product.

BRIEF SUMMARY

In a first example, a continuous method of reducing copper metal content of shredded scrap steel is provided. The method comprises continuously separating a first scrap steel fraction from an amount of scrap steel concurrently with separating a second fraction from the amount of scrap steel; continuously separating the second fraction and providing a nonmagnetic fraction and, concurrently, a third scrap steel fraction; grinding the nonmagnetic fraction followed by magnetic separation to provide a fourth scrap steel fraction and, concurrently, an enriched nonmagnetic fraction; continuously combining the first scrap steel fraction, the third scrap steel fraction, and the fourth scrap steel fraction to obtain a combined scrap steel product comprising scrap steel with reduced copper metal content; and introducing the combined scrap steel product to an electric arc furnace.

In one aspect, the copper metal content of the scrap steel is at least 0.30 weight percent copper. In another aspect, alone or in combination with any one of the previous aspects, the second fraction comprises iron and non-magnetic material. In another aspect, alone or in combination with any one of the previous aspects, the third scrap steel fraction is magnetically separated from the nonmagnetic fraction. In another aspect, alone or in combination with any one of the previous aspects, the nonmagnetic fraction is cryoground.

In another aspect, alone or in combination with any one of the previous aspects, the enriched nonmagnetic metal fraction comprises one or more of stainless steel, copper, nickel, aluminum, gold, chrome, manganese, brass, and bronze. In another aspect, alone or in combination with any one of the previous aspects, the method further comprises providing a separated, enriched copper product from the scrap steel. In another aspect, alone or in combination with any one of the previous aspects, the method further comprises separating a stainless steel enriched fraction from the enriched nonmagnetic metal fraction.

In another aspect, alone or in combination with any one of the previous aspects, the combined scrap steel product comprises less than or equal to 0.20 weight percent copper. In another aspect, alone or in combination with any one of the previous aspects, the method further comprises, prior to introducing the combined scrap steel product to the electric arc furnace, combining the stainless steel enriched fraction with the combined scrap steel product.

In another aspect, alone or in combination with any one of the previous aspects, the combined scrap steel product and optionally the stainless steel enriched fraction comprises less than or equal to 0.20 weight percent copper. In another aspect, alone or in combination with any one of the previous aspects, the combined scrap steel product and optionally the stainless steel enriched fraction comprises between 0.16-0.19 weight percent copper.

In another aspect, alone or in combination with any one of the previous aspects, the method further comprises, prior to introducing the combined scrap steel product to the electric arc furnace, combining the combined scrap steel product with at least one of pig iron or direct reduced iron (DRI).

In another example, a system for reducing copper metal content of scrap steel is provided. The system comprises a first separator configured to continuously receive an amount of scrap steel containing copper metal and to continuously provide a first scrap steel fraction with less than or equal to 0.20 weight percent copper and to provide a second fraction comprising iron and nonmagnetic material of greater than or equal to 0.50 weight percent copper; a second separator configured to continuously receive the second fraction from the first separator and to provide a third scrap steel fraction and a nonmagnetic fraction; and a third separator configured to continuously receive the nonmagnetic fraction and to provide a fourth scrap steel fraction. The system is configured to continuously combine the first scrap steel, the third scrap steel fraction, and the fourth scrap steel fraction and to obtain: a combined scrap steel product having less than or equal to 0.20 weight percent copper, and a final fraction comprising predominantly copper and nonmagnetic material.

In another aspect, alone or in combination with any one of the previous aspects, the first separator comprises a shredded scrap steel ballistic separator. In another aspect, alone or in combination with any one of the previous aspects, the second separator comprises an electromagnetic separator.

In another aspect, alone or in combination with any one of the previous aspects, the system further comprises a grinder or cryogrinder configured to continuously receive the nonmagnetic fraction from the second separator.

In another aspect, alone or in combination with any one of the previous aspects, the system further comprises an electric arc furnace configured to receive the combined scrap steel product. In another aspect, alone or in combination with any one of the previous aspects, the system is further configured to combine the combined scrap steel product with at least one of pig iron or direct reduced iron (DRI) prior to introducing the combined scrap steel product to the electric arc furnace.

In another aspect, alone or in combination with any one of the previous aspects, the system is further configured to provide a separated, enriched copper product from the scrap steel.

In yet another example, a continuous method of reducing copper metal content of shredded scrap steel is provided. The method comprises continuously separating a first shredded scrap steel fraction from an amount of shredded scrap steel concurrently with separating a second fraction from the amount of shredded scrap steel; continuously separating the second fraction and providing a nonmagnetic fraction and, concurrently, a third shredded scrap steel fraction; grinding the nonmagnetic fraction followed by magnetic separation to provide a fourth shredded scrap steel fraction and, concurrently, an enriched nonmagnetic fraction; continuously combining the first shredded scrap steel fraction, the third shredded scrap steel fraction, and the fourth shredded scrap steel fraction to obtain a combined shredded scrap steel product comprising shredded scrap steel with reduced copper metal content; and introducing the combined shredded scrap steel product to an electric arc furnace.

BRIEF DESCRIPTION OF THE DRAWINGS

In order to understand and to see how the present disclosure may be carried out in practice, examples will now be described, by way of non-limiting examples only, with reference to the accompanying drawings, in which.

DETAILED DESCRIPTION

While copper metal is present in steel sheet, and at low levels (e.g., about 0.10 wt % copper) provides significant benefit thereto, an excess of copper metal can be detrimental in the downstream steel sheet production processes. It is desirable to utilize shredded scrap steel in the production of steel sheet provided that the costs of removing the excess copper metal or the cost of diluting the shredded scrap steel with pig iron or direct reduced iron (DRI) is economically feasible. Therefore, it is a technical problem to cost-effectively remove copper from shredded scrap steel so that the shredded scrap steel can be recycled in the production of steel sheet without the need to dilute the shredded scrap steel with an amount of pig iron or DRI that otherwise makes the use of the shredded scrap steel non-economical for this purpose. The present disclosure provides a technical solution to cost-effectively use shredded scrap steel as a source of low copper iron scrap, whereby a continuous process is used to continuously separate copper and other nonferrous and nonmagnetic metals from the shredded scrap steel so as to provide a final shredded scrap steel product suitable for use in steel sheet manufacturing. As a result, the systems and methods described herein significantly decrease operating costs in sheet steel production, improve supply chain flexibility, reduce greenhouse gases from electric arc furnace processes, and further provide separated, value-added copper.

The phrase "shredded scrap steel", as used herein, may generally refer to a mechanically-treated combination of at least ferrous, non-ferrous, glass, plastic, rubber, and foam materials and/or the like, typically originating from automobiles and home appliances, that is physically reduced (e.g., by a hammer mill shredder) to an approximately homogeneous size and form suitable for transportation and use in the systems and methods described herein. Shredded scrap steel may also include larger agglomerations or smaller fines of any of the component materials. Shredded scrap steel may have an average density of approximately 75-85 pounds per cubic foot but, as understood by one of ordinary skill in the art, may not be so limited. Individual pieces of shredded scrap steel may be approximately 5-8 inches long, approximately 3-6 inches wide, and approximately 1-5 inches thick but, as understood by one of ordinary skill in the art, may not be so limited.

This disclosure provides for a continuous method of reducing copper metal content of shredded scrap steel with non-ferrous material present therein using a continuous multi-separation process with combining of low copper shredded scrap steel fractions suitable for use in steel sheet production, e.g., using an electric arc furnace (EAF). The method comprises continuously separating a first shredded scrap steel fraction from an amount of shredded scrap steel concurrently with separating a second fraction from the amount of shredded scrap steel, continuously separating the second fraction and providing a nonmagnetic fraction and, concurrently, a third shredded scrap steel fraction, grinding the nonmagnetic fraction followed by magnetic separation to provide a fourth shredded scrap steel fraction and, concurrently, an enriched nonmagnetic metal fraction, continuously combining the first shredded scrap steel fraction, the third shredded scrap steel fraction, and the fourth shredded scrap steel fraction, to obtain a combined shredded scrap steel product with reduced copper metal content, and introducing the combined shredded scrap steel product to an electric arc furnace.

In one example, the presently disclosed method is an automated method of copper removal unlike conventional methods used today that use people to pick copper meatballs and copper wiring off shredded scrap steel conveyor belts. While robotic devices can be used in the present method, they are not required; thus, in one example, the presently disclosed method is an automated, non-robotic method of copper removal from shredded scrap steel.

The present disclosure provides for a multi-separation method and system for utilizing shredded scrap steel with an excess of copper content to provide a low copper shredded scrap steel product for direct use in steel sheet production. The separation processes are now described with the understanding that the processes are independent of each other and can be performed concurrently or non-concurrently relative to each other in a continuous or semi-continuous process. In one example, the method is carried out and the system configured such that the separation processes are independent of each other and are performed concurrently or non-concurrently relative to each other in a continuous manner. For example, a first separation is performed providing at least two fractions, and at least one of the at least two fractions are subjected to a second and/or third separation. The second and/or third separation is performed on at least one of the at least two fractions concurrently or in any order.

System

The present disclosure provides a system for reducing copper metal content of shredded scrap steel using a first separator configured to continuously receive an amount of shredded scrap steel containing copper metal and to continuously provide a first shredded scrap steel fraction with less than or equal to 0.20 weight percent copper and to provide a second fraction comprising iron and nonmagnetic material of greater than or equal to 0.50 weight percent copper. The system includes a second separator configured to continuously receive the second fraction from the first separator and to provide a third shredded scrap steel fraction and a nonmagnetic fraction. The system includes a third separator configured to continuously receive the nonmagnetic fraction from the second separator and to provide a fourth shredded scrap steel fraction.

The system is configured to continuously combine the first shredded scrap steel fraction, the third shredded scrap steel fraction, and the fourth shredded scrap steel fraction and to obtain a combined shredded scrap steel product of less than or equal to 0.20 weight percent copper and a final fraction comprising predominantly copper and nonmagnetic material.

In one example, the first separator is a shredded scrap steel ballistic separator, the second separator is an electromagnetic separator, and the third separator is an eddy current separator. Eddy current separators remove nonferrous metals (e.g., copper and aluminum) from nonmetallic materials such as cloth, rubber, plastic, etc., as well as stainless steel. Typically, material is fed onto a conveyor belt of the eddy current separator, which moves it across a magnetic rotor where separation occurs, causing two streams of material to be discharged into a housing which has a splitter to divide the nonferrous metal (e.g., copper and aluminum) from stainless steel material. Eddy current separators with concentric or eccentric rotor design can be used. Commercial eddy current separators from Eriez (Erie, PA), Goudsmit Magnetics (Waalre, NL), and Bunting (Redditch, UK) can be used. In another example, the third separator is a magnetic separator in combination with an eddy current separator. In another example, the third separator is coupled to a cryogrinder or mill. The grinder or cryogrinder is configured to continuously receive the nonmagnetic fraction from the second separator.

The system is further configured to present the combined shredded scrap steel product to an electric arc furnace. In one example, the system is further configured to combine the combined shredded scrap steel product with at least one of pig iron or direct reduced iron (DRI) prior to introducing the combined shredded scrap steel product to the electric arc furnace.

Figure 1:
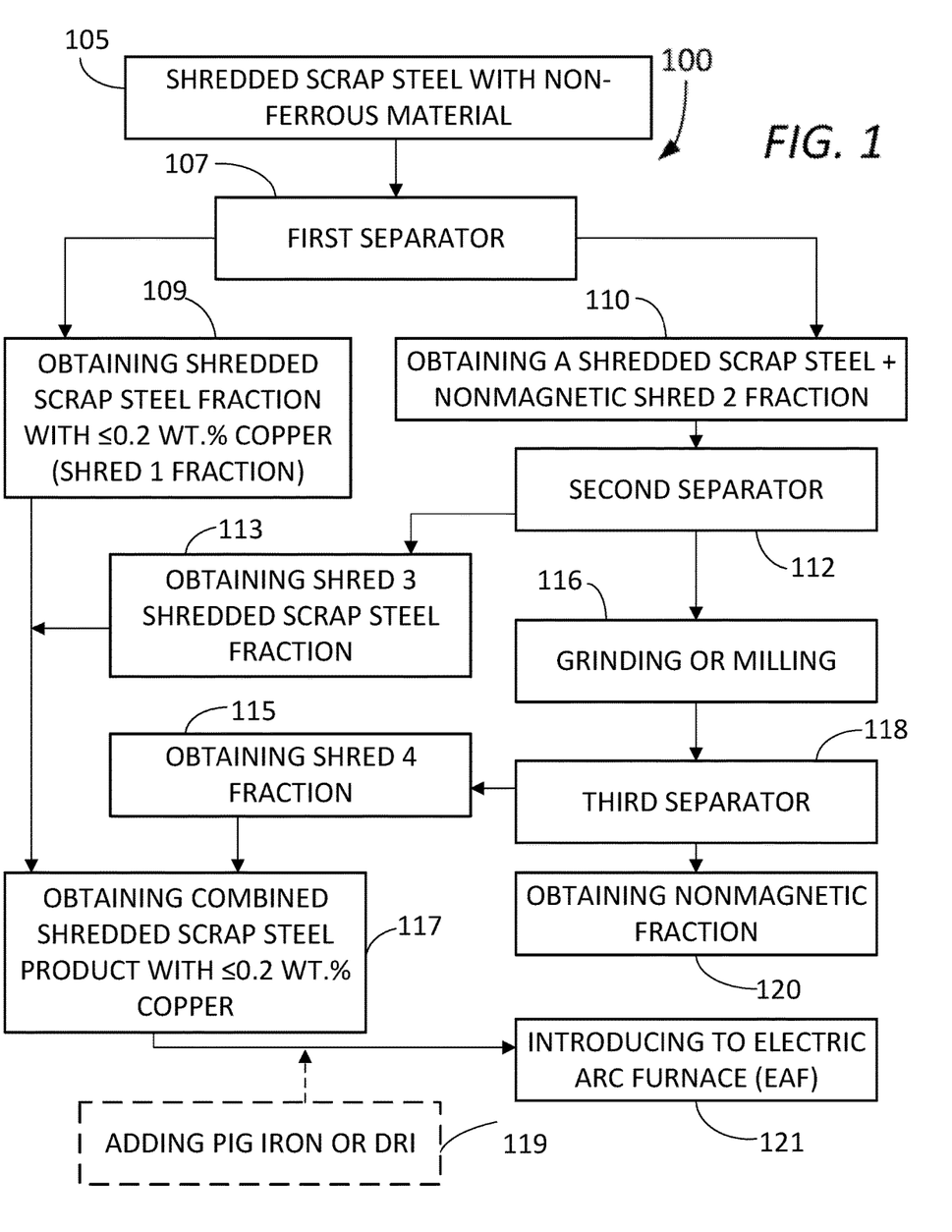
FIG. 1 is a schematic flow diagram illustrating the system in accordance with the broadest aspect of the present disclosure.

Thus, with reference to FIG. 1, system 100 is schematically depicted with shredded scrap steel with nonferrous material 105 being introduced to first separator 107 providing "shred 1" shredded scrap steel fraction 109 with less than or equal to 0.2 weight percent copper and shredded scrap steel/nonmagnetic "shred 2" fraction 110. Shred 2 fraction 110 is introduced to second separator 112 that provides "shred 3" shredded scrap steel fraction 113 suitable for combining with shred 1 shredded scrap steel fraction 109. Remainder material from second separator 112 can be subject to grinding or milling 116 and introduced to third separator 118 so as to provide a nonmagnetic fraction 120 as well as "shred 4" shredded scrap steel fraction 115 suitable for combining with shred 1 shredded scrap steel fraction 109 and shred 3 shredded scrap steel fraction 113. Nonmagnetic fraction 120 is enriched in copper and other valuable transition metals suitable for recycling. Combined shredded scrap steel fractions 117 having less than or equal to 0.2 weight percent copper are suitable for introduction to electric arc furnace 121 and/or for combining with pig iron and/or direct reduced iron 119 prior to introduction to the electric arc furnace.

Figure 2:
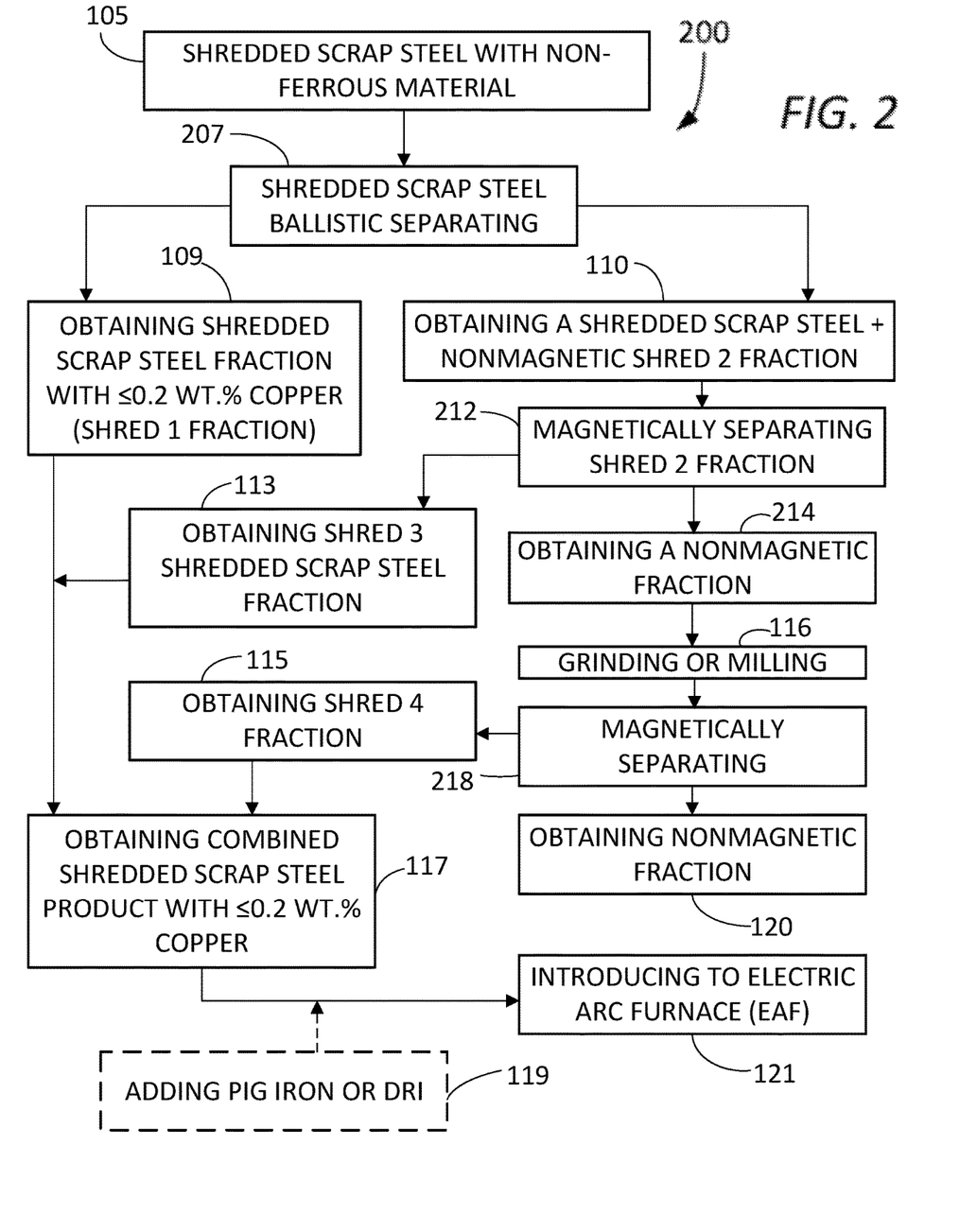
FIG. 2 is a schematic flow diagram illustrating main steps for performing the process in accordance with the broadest aspect of the present disclosure.

With reference to FIG. 2, an exemplary method 200 in accordance with the present disclosure is depicted shredded scrap steel with nonferrous material 105 is introduced to shredded scrap steel ballistic separating 207 from which shred 1 fraction 109 and shred 2 fraction 110 result. Shred 2 fraction is magnetically separated at step 212 providing shred 3 shredded scrap steel fraction 113 as well as a nonmagnetic fraction 214 that is subject to grinding or milling 116, for example a ring type grinding mill, and then magnetically separating at step 218 is performed to provide nonmagnetic fraction 120 as well as shred 4 fraction 115. Combined shredded scrap steel fractions 117 having less than or equal to 0.2 weight percent copper are suitable for introduction to electric arc furnace 121 and/or for combining with pig iron and/or direct reduced iron 119 prior to introduction to the electric arc furnace.

Figure 3:
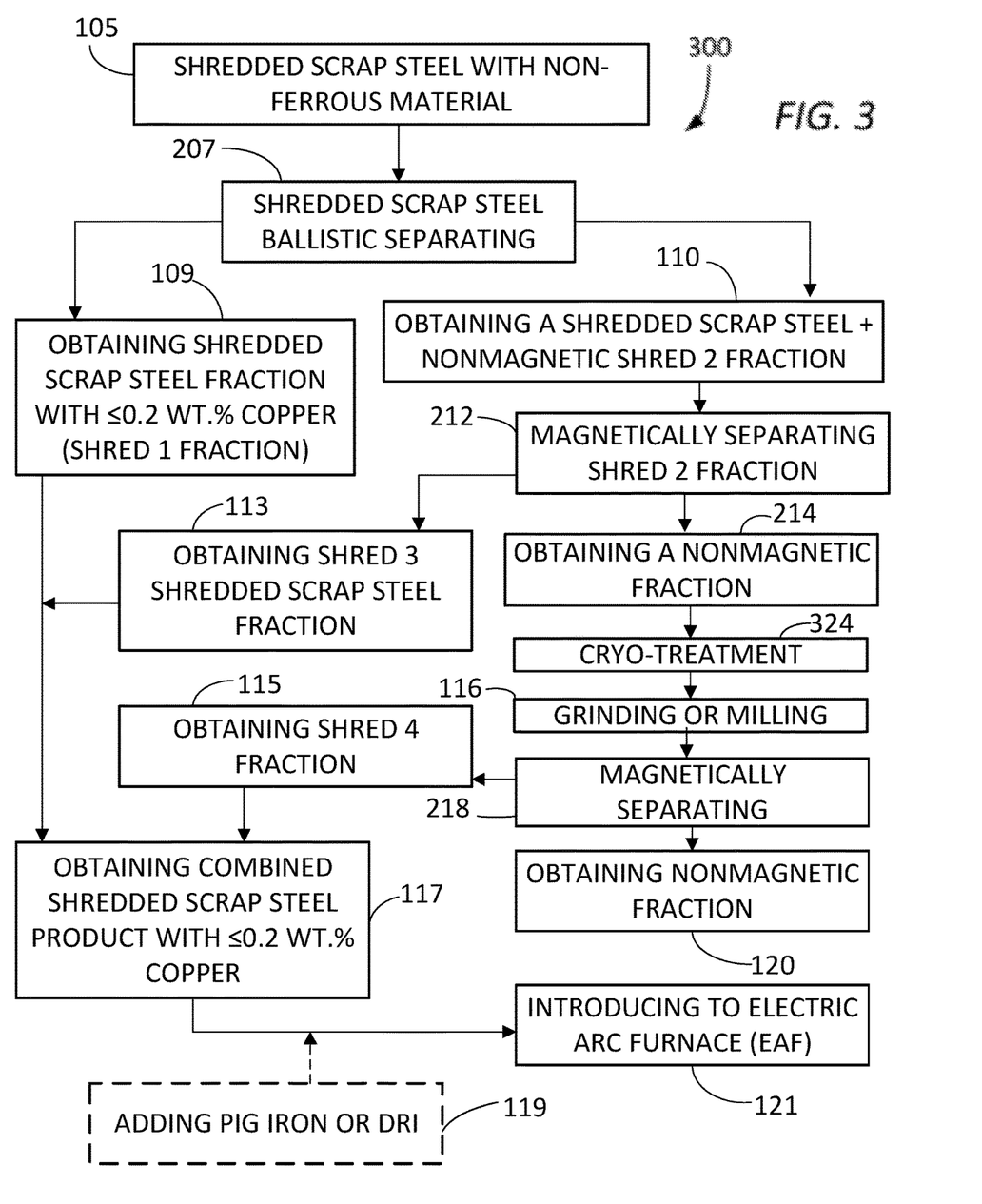
FIG. 3 is a schematic flow diagram illustrating alternative main steps for performing the process in accordance with the broadest aspect of the present disclosure.

With reference to FIG. 3, an alternative method 300 to that of FIG. 2, is depicted, with alternative cryo-treatment (e.g., cryogrinding) step 324 of nonmagnetic fraction 214 prior to magnetic separation step 218. Cryogrinding the mixture of various and nonferrous material in step 324 reduces the size of the shred and facilitates improved magnetic separation efficiency.

Figure 4:
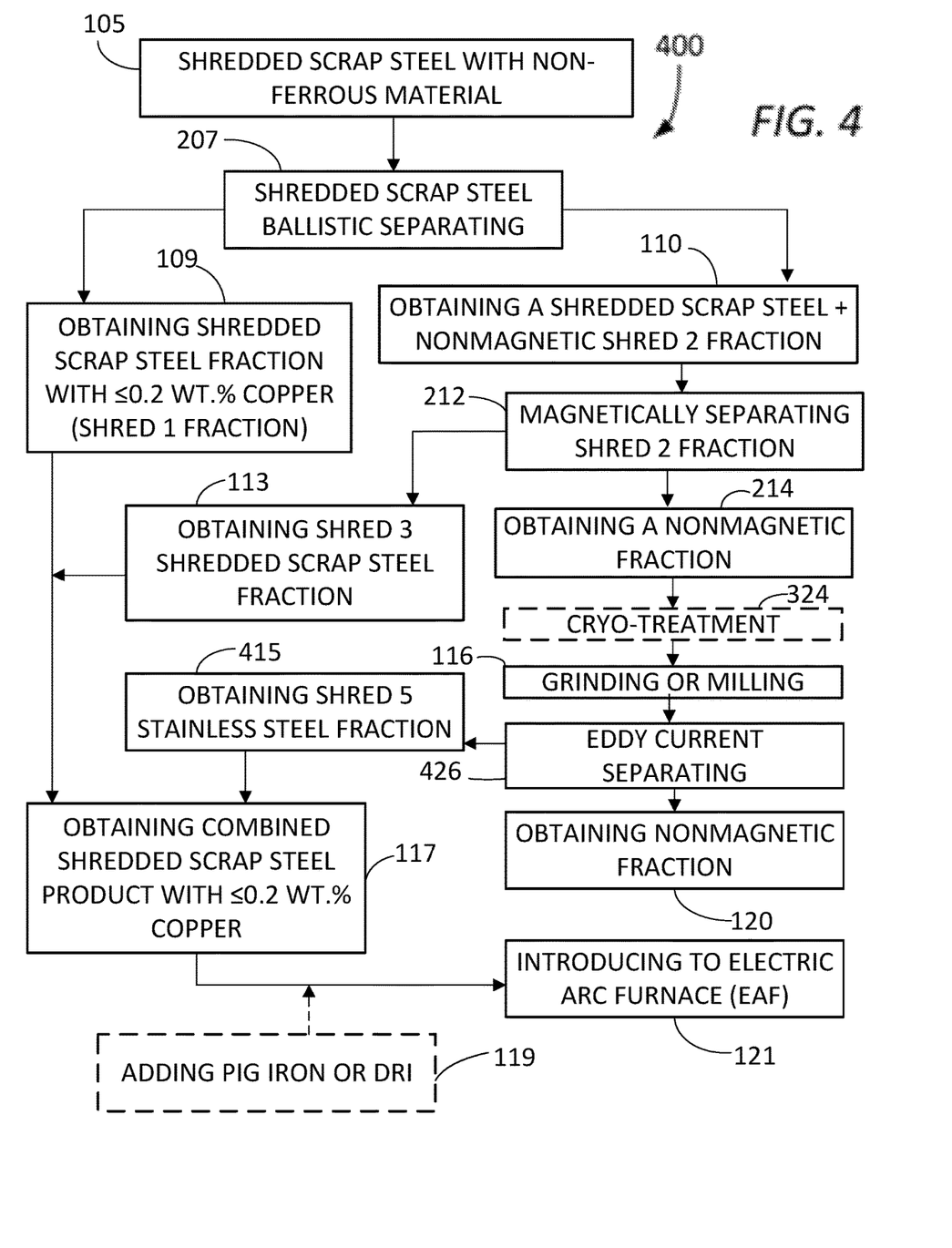
FIG. 4 is a schematic flow diagram illustrating alternative main steps for performing the process in accordance with the broadest aspect of the present disclosure.

With reference to FIG. 4, another alternative method 400 to that of methods 200 and 300 is depicted, wherein eddy current separating step 426 is used to facilitate separation of salvageable, nonmagnetic ferrous material such as stainless steel from nonmagnetic fraction 214, which can be optionally cryogenically treated in step 324, so as to provide "shred 5" stainless steel fraction 415. Combined shredded scrap steel fractions 117 having less than or equal to 0.2 weight percent copper are suitable for introduction to electric arc furnace 121 and/or for combining with pig iron and/or direct reduced iron 119 prior to introduction to the electric arc furnace.

First Separation

By way of example, an exemplary shredded scrap steel feed that is provided in amounts ranging from about 80 tons per hour (TPH) to about 125 TPH with a copper content of at least 0.30 weight percent by weight can be continuously separated into a first shredded scrap steel fraction having an average copper content of 0.20 percent by weight or less of copper (approximately 75% of the 125 TPH), and a second fraction of approximately 25% of the about 80 TPH (20 TPH) to about 125 TPH (30 TPH) having a copper content of greater than 0.50 weight percent copper. The first shredded scrap steel fraction comprises an appreciable amount of low copper iron (approximately 60 TPH to 95 TPH of less than 0.20 weight percent copper). The remainder of the first separation (the second fraction) provides for approximately 20 TPH to 30 TPH (~25% of the 80 TPH to 125 TPH), of nonmagnetic material that also contains an appreciable amount of recoverable iron. Thus, in the present disclosure, this 20 TPH to 30 TPH of recoverable iron and nonmagnetic material is further continuously separated in a second separating step.

In one example, the first separator is a shredded scrap steel ballistic separator with a magnetic head pulley rotating a conveyor with a splitter positioned in proximity thereto, such as an Eriez Shred1 Ballistic Separator (Erie, PA), or a Steinert US SteelMaster Ballistic Separator (Walton, KY). Other shredded scrap steel ballistic separators can be used. A magnetic head pulley rotating a conveyor in combination with a strategically placed splitter enables separation of the magnetic shredded scrap steel from the nonmagnetic scrap as it reaches the end of the conveyor belt. Thus, magnetic material is constrained leaving the end of the conveyor belt and is projected a shorter distance from the end thereof than the nonmagnetic material. In one example, a splitter is positioned at the end of the magnetic head pulley driven conveyor of the first separator so as to continuously partition the first shredded scrap steel fraction from material to be received by the second separator.

Second Separation

In the second separating step of the present disclosure, by way of example, the approximately 30 TPH of the second fraction is separated so as to provide a third shredded scrap steel fraction at approximately 21 tons per hour that is a low copper content shredded scrap steel suitable for combining with the first shredded scrap steel fraction as well as approximately 9 TPH of a nonmagnetic fraction. Thus, in the present disclosure, from the 125 tons per hour of shredded scrap steel processed continuously, approximately 116 tons per hour of low copper shredded scrap steel fraction is provided, or greater than 90% of the weight of the total shredded scrap steel processed per hour after performing the first and the second separation. In one example, the first and the third shredded scrap steel fractions are combined. In another example, the first and the third shredded scrap steel fractions are continuously combined. This combined low copper shredded scrap steel fraction is suitable for producing steel sheet, for example, using an electric arc furnace (EAF). In one example, the second separator is an electromagnetic separator (e.g., a dry electromagnetic drum separator or magnetic polishing drum). The electromagnetic separator is positioned in proximity to a conveyor belt and is configured to receive a shred feed via the conveyor belt. In one example, the electromagnetic separator is separated from the end of a conveyor by a gap distance, a distance between the end of the conveyor and the electromagnetic drum. In one example, the gap distance is between about 6 inches to about 24 inches. Magnetic scrap is attracted to the drum surface, and the nonmagnetic material falls off the conveyor with a normal trajectory. In one example, a variable electromagnetic field of about 500-5000 gauss is used. Commercially available dry electromagnetic drum separators are available from Eriez (Erie, PA). A crossbelt magnetic separator can also be used as the second separator, for example, a TUFFMAN© Crossbelt Magnetic Separator (Tuffman, Crystal Lake, IL).

Third Separation

In the above example, a salvageable amount of iron is present in the 9 TPH of the nonmagnetic fraction. Thus, the present disclosure provides for a continuous third separating of the approximately 9 TPH of nonmagnetic material so as to retrieve and separate the salvageable amount of iron and also to provide an enriched source of nonmagnetic material (e.g., copper and aluminum) that can be further recovered, sold, and/or recycled. The amount of salvageable iron obtained from the third separating varies based on the origins of the shredded scrap steel but can be as much as 0.5 to 5 TPH of low copper content iron.

In the above example, the approximately 9 TPH of nonmagnetic material with salvageable ferrous content is ground or milled. In the above example, the approximately 9 TPH of nonmagnetic material is cryoground. Cryogrinding a mixture of ferrous metal and nonmagnetic material (e.g., copper) results in the ferrous metal becoming brittle whereas the copper remains ductile, thus, facilitating improved separation using methods such as magnetic separation and/or eddy current separation for providing a fourth shredded scrap steel fraction and an enriched nonmagnetic metal fraction. In one example, the enriched nonmagnetic metal fraction comprises one or more of stainless steel, copper, nickel, aluminum, gold, brass, and bronze. In one example, the enriched nonmagnetic metal fraction is subjected to an eddy current separation for separating a stainless steel enriched fraction that can be combined with any one of the first shredded scrap steel fraction or the third shredded scrap steel fraction. In another example, the enriched nonmagnetic metal fraction is continuously combined with any one of the first shredded scrap steel fraction or the third shredded scrap steel fraction.

In one example, a magnetic polishing drum is used as the third separator after cryogrinding of the second fraction. Various types of cryogenic treatment can be employed to facilitate separation of nonferrous metal from salvageable ferrous material. Shred 2 can be subjected to liquid nitrogen or dry ice contact and subsequently grinded or milled to a preferred particle size. Commercially available magnetic polishing drums are available from Eriez (Erie, PA). In another example, a crossbelt magnetic separator can also be used as the third separator, for example, a TUFFMAN© Crossbelt Magnetic Separator (Tuffman, Crystal Lake, IL). In one example, the third separator is coupled with a ring mill grinding device. The ring mill grinding device can be operated at an RPM of between 50 RPM-250 RPM. In another example, the crossbelt magnetic separator is configured in proximity to the ring mill grinding device for receiving material from the ring mill grinding device. In one example, the crossbelt magnetic separator coupled to the ring mill grinding device can be operated at a speed of about 2 ft./m to about 24 ft./m. Other RPMs and conveyor speeds can be used. In one example, the grain size of the product exiting the ring mill grinding device is approximately quarter (0.25) inch to about 2 inches in average diameter.

The above system and methods further provide for obtaining an enriched copper product from the shredded scrap steel in one example, for example, in addition to removing copper meatballs from the shredded scrap steel, copper wiring is provided in pieces that is readily separated in essentially pure form so as to provide for an enriched copper product of appreciable value.

Continuously Feeding an Electric Arc Furnace

In one example, the presently disclosed method continuously combines the first, third, and fourth shredded scrap steel fractions (a combined shredded scrap steel product) of less than or equal to 0.20 weight percent copper. In another example, the presently disclosed method combines the stainless steel enriched fraction with the combined shredded scrap steel product. The combined shredded scrap steel product, and optionally the stainless steel enriched fraction, has a copper metal content of between 0.16-0.19 weight percent. Thus, the continuously provided combined shredded scrap steel product obtained by the presently disclosed method is suitable for use in the production of steel sheet, for example, using an electric arc furnace.

In one example, the combined shredded scrap steel product, prior to introducing to the electric arc furnace, and optionally the stainless steel enriched fraction, are combined with at least pig iron or directly reduced iron (DRI). Additionally, in one example, other forms of scrap steel are added into the electric arc furnace along with the shredded scrap steel, pig iron, and/or DRI, as well as a carbon source (e.g., coal) and fluxes (e.g., limestone).

EXAMPLE

Shredded scrap steel samples were run through the systems and methods described herein to validate delivery of the desired copper reduction in order to provide a final shredded scrap steel product of 0.17+/−0.02 weight percent copper.

A 1.0-ton shredded scrap steel sample was initially tested as a "proof of concept" test. After this test produced the required copper reduction results (as shown in the table below), test sample weights were increased by factors of 10 with 10-ton, 100-ton, and 1000-ton samples.

The copper analysis of the separated shredded scrap steel samples was initially carried out using a Gamma-Tech™ crossbelt prompt gamma neutron activation analysis (PG-NAA) analyzer. Some of the larger-sized test samples were additionally analyzed using electric arc furnace dead melt analysis where the separated shredded scrap steel samples were melted in a 300-ton electric arc furnace with metals analysis conducted by traditional emission spectroscopy used at electric arc furnace operations.

Test work was performed over a twelve month period to demonstrate the efficacy of the copper reduction systems and methods disclosed herein, as well as to provide reproducible results when scaled up. A table of results for these tests is shown below.

| Test | Feed wt % Cu | Shred#1 wt % Cu | Shred#3 wt % Cu | Shred#4 wt % Cu | Final Shred Product wt % Cu | wt % Cu Removed | % Weight Recovery |
|---|---|---|---|---|---|---|---|
| 1 Ton | 0.35 wt % Cu | 0.17 wt % Cu | 0.26 wt % Cu | 0.27 wt % Cu | 0.19 wt % Cu | 0.16 wt % Cu | 90% |
| 10 Ton | 0.38 wt % Cu | 0.21 wt % Cu | 0.27 wt % Cu | 0.38 wt % Cu | 0.25 wt % Cu | 0.13 wt % Cu | 97% |
| 100 Ton | 0.35 wt % Cu | 0.17 wt % Cu | 0.17 wt % Cu | 0.26 wt % Cu | 0.18 wt % Cu | 0.17 wt % Cu | 98% |
| 1000 Ton | 0.31 wt % Cu | 0.16 wt % Cu | 0.18 wt % Cu | 0.32 wt % Cu | 0.18 wt % Cu | 0.13 wt % Cu | 97% |

As the results indicate, the described systems and methods produce an excellent weight percent copper reduction as well as excellent weight recovery for shredded scrap steel passed through this physical copper reduction process in both small- and large-scale samples. Indeed, the scaled-up data was highly reproducible and demonstrated the validity of the copper reduction systems and methods disclosed herein in being able to successfully reduce the weight percent copper in shredded scrap steel from 0.30 wt % copper-0.35 wt % copper down to less than 0.20 wt % copper.

While certain embodiments of the present disclosure have been illustrated with reference to specific combinations of elements, various other combinations may also be provided without departing from the teachings of the present disclosure. Thus, the present disclosure should not be construed as being limited to the particular exemplary embodiments described herein and illustrated in the Figures, but may also encompass combinations of elements of the various illustrated embodiments and aspects thereof.

We claim:

1. A continuous method of reducing copper metal content of shredded scrap steel with non-ferrous material present therein, the method comprising:
    continuously separating a first scrap steel fraction from an amount of scrap steel concurrently with separating a second fraction from the amount of scrap steel via a ballistic separator;
    continuously magnetically separating the second fraction and providing a nonmagnetic fraction and, concurrently, a third scrap steel fraction;
    grinding the nonmagnetic fraction followed by magnetic separation to provide a fourth scrap steel fraction and, concurrently, an enriched nonmagnetic metal fraction;
    continuously combining the first scrap steel fraction, the third scrap steel fraction, and the fourth scrap steel fraction to obtain a combined scrap steel product comprising scrap steel with reduced copper metal content; and
    introducing the combined scrap steel product to an electric arc furnace.

2. The method of claim 1, wherein the copper metal content of the scrap steel is at least 0.30 weight percent copper.

3. The method of claim 1, wherein the second fraction comprises iron and nonmagnetic material.

4. The method of claim 1, wherein the nonmagnetic fraction is cryoground.

5. The method of claim 1, wherein the enriched nonmagnetic metal fraction comprises one or more of stainless steel, copper, nickel, aluminum, manganese, chrome, gold, brass, and bronze.

6. The method of claim 1, wherein the combined scrap steel product comprises less than or equal to 0.20 weight percent copper.

7. The method of claim 1, further comprising separating a stainless steel enriched fraction from the enriched nonmagnetic metal fraction.

8. The method of claim 7, wherein the combined scrap steel product and optionally the stainless steel enriched fraction comprises less than or equal to 0.20 weight percent copper.

9. The method of claim 7, wherein the combined scrap steel product and optionally the stainless steel enriched fraction comprises between 0.16-0.19 weight percent copper.

10. The method of claim 7, further comprising, prior to introducing the combined scrap steel product to the electric arc furnace, combining the stainless steel enriched fraction with the combined scrap steel product.

11. The method of claim 1, further comprising, prior to introducing the combined scrap steel product to the electric arc furnace, combining the combined scrap steel product with at least one of pig iron or direct reduced iron (DRI).

12. The method of claim 1, further comprising separating copper from the enriched nonmagnetic metal fraction to provide a separated, enriched copper product from the scrap steel.

13. A system for reducing copper metal content of shredded scrap steel, the system comprising:
- a first separator configured to continuously receive an amount of scrap steel containing copper metal and to continuously provide a first scrap steel fraction with less than or equal to 0.20 weight percent copper and to provide a second fraction comprising iron and nonmagnetic material of greater than or equal to 0.50 weight percent copper;
- a second separator configured to continuously receive the second fraction from the first separator and to provide a third scrap steel fraction and a nonmagnetic fraction; and
- a third separator configured to continuously receive the nonmagnetic fraction and to provide a fourth scrap steel fraction and an enriched nonmagnetic metal fraction,
- wherein the system is configured to continuously combine the first scrap steel fraction, the third scrap steel fraction, and the fourth scrap steel fraction and to obtain:
  - a combined scrap steel product having less than or equal to 0.20 weight percent copper, and
  - the enriched nonmagnetic metal fraction comprising copper and nonmagnetic metal.

14. The system of claim 13, wherein the first separator comprises a shredded scrap steel ballistic separator.

15. The system of claim 13, wherein the second separator comprises an electromagnetic separator.

16. The system of claim 13, further comprising a grinder or cryogrinder configured to continuously receive the nonmagnetic fraction from the second separator.

17. The system of claim 13, further comprising an electric arc furnace configured to receive the combined scrap steel product.

18. The system of claim 17, wherein the system is further configured to combine the combined scrap steel product with at least one of pig iron or direct reduced iron (DRI) prior to introducing the combined scrap steel product to the electric arc furnace.

19. The system of claim 13, wherein the system is further configured to provide a separated, enriched copper product from the scrap steel.

* * * * *